United States Patent Office 3,836,508
Patented Sept. 17, 1974

3,836,508
SULFOBENZYLMALONIC ACID MODIFIED
TEREPHTHALIC ACID POLYESTERS
Eduard Radlmann and Günther Nischk, Dormagen, Germany, assignors to Bayer Aktiengesellschaft, Leverkusen, Germany
No Drawing. Filed May 18, 1973, Ser. No. 361,524
Claims priority, application Germany, May 20, 1972,
P 22 24 831.3
Int. Cl. C08g 17/08
U.S. Cl. 260—75 S                                    6 Claims

ABSTRACT OF THE DISCLOSURE

Acid modified terephthalic acid polyesters containing structural elements of sulfonatobenzyl malonic acid. The polyesters are easily dyeable with basic dyestuffs and can be spun from the melt into filaments.

This invention relates to terephthalic acid polyesters which are modified with sulfonate groups and which can be dyed with basic dyes. They are prepared by solvent-free condensation of terephthalic acid or its derivatives with a glycol and a sulfonatobenzyl malonic acid or its derivatives.

It is known that sulfonate groups can be built into polyethylene terephthalate, for example by co-condensing sodium 3,5-di-(carbomethoxy)-benzene sulfonate or sodium 1-[3',5'-di-(carbomethoxy)phenoxy]-propane sulfonate-(3) with dimethyl terephthalate and ethylene glycol. The disadvantage of these comonomers which contain sulfonate groups is that they are difficult to be obtained commercially. In the first case, sulfonation of isophthalic acid must be carried out with fuming sulfuric acid at temperatures above 200° C. and in the second case 5-hydroxy-isophthalic acid, which is difficult to prepare, is reacted with physiologically very harmful sultones such as propane sultone.

It is an object of this invention to provide high molecular weight sulfonate groups containing terephthalic acid copolyesters which are well available.

It is another object of this invention to provide high molecular weight sulfonate groups containing terephthalic acid copolyesters that are easily dyeable with basic dyes and have at the same time advantageous physical properties which makes them capable of being spun into fibers.

Further objects will be evident from the following description and from the examples.

These objects are accomplished by a high molecular weight, linear terephthalic acid copolyester which contains sulfonate groups and which consist essentially of recurrent structural elements of the general formula $$\left[\begin{matrix} O & O \\ \|\!-\!C\!-\!X\!-\!C\!-\!O\!-\!R\!-\!O \end{matrix}\right]$$

in which

X consists of 99–70 mols-percent of a phenylene group and 1–30 mols-percent of a sulfonate-containing group of the general formula

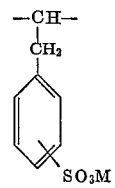

in which M denotes a metal, and
R represents a $C_2$ to $C_{20}$ straight or branched chain alkylene group a cycloalkylene group or a group of the general formula

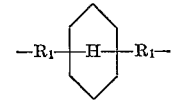

in which $R_1$ is a straight or branched chain $C_1$ to $C_{10}$ alkylene group.

These terephthalic acid copolyesters have relative solution viscosities $\eta_{rel.}$ in the region 1.1–4.0 (determined in a solution of 1 g. of substance in 100 ml. of m-cresol at 25° C.).

The preferred representatives of this class of polyesters consist of 99–70 mols-percent of recurrent structural element of the general formula

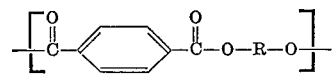

in which

R has the meaning indicated above and 1–30 mols-percent of structural elements of the general formula

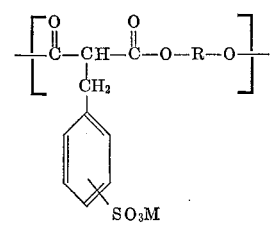

in which

R has the meaning indicated above, and M denotes a metal.

The preferred metals in the sulfonate groups are alkali metals.

The terephthalic acid copolyesters preferably contain 1–10 mols-percent of structural elements of sulfonatobenzyl malonic acid, based on the total quantity of the dicarboxylic acid structural elements.

To prepare these polyterephthalates modified with sulfonate groups, dicarboxylic acid derivatives of the general formula

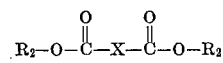

in which

X represents a phenylene group or a sulfonate-containing group of the general formula

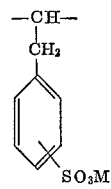

in which M denotes a metal, and
$R_2$ represents hydrogen or a straight or branched chain alkyl group containing from 1–10 carbon atoms and a diol of the general formula

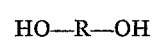

in which

R represents a straight or branched chain alkylene group containing from 2–20 carbon atoms, a cycloalkylene group or a group of the general formula

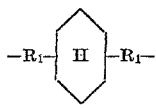

in which $R_1$ is a straight or branched chain alkylene group containing from 1–10 carbon atoms are mixed together and polycondensed, preferably at temperatures of 150–300° C. without solvent and with the exclusion of moisture and oxygen in an inert gas atmosphere at pressures between normal pressure and 0.001 mm. Hg with the aid of known catalysts, the two reactants being mixed in such proportions that the quality of sulfonate-containing benzyl malonic ester built into the modified polyterephthalate by condensation is between 1 and 30 mols-percent, based on the quantity of dicarboxylic acids which have been incorporated by condensation.

It must be regarded as surprising that the sulfonatobenzyl malonic acid derivatives can be co-condensed without any signs of decarboxylation and do not act as chain breaking agents.

The reactants which are polycondensed with each other are preferably a diol of the general formula $$HO-R-OH,$$

in which

R has the meaning indicated above and a mixture of 99–70 mols-percent of the dicarboxylic acid derivative of the general formula

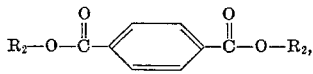

in which $R_2$ has the meaning specified above and 1–30 mols-percent of a sulfonate-containing dicarboxylic acid derivative of the general formula

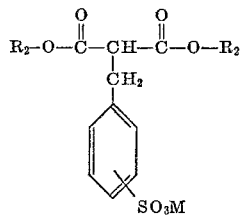

in which $R_2$ has the meaning specified above.

The modified polyterephthalates obtained by this process can easily be processed without solvents to produce shaped structures, particularly threads and foils.

The sulfonatobenzyl malonic acids and their derivatives used for modifying the new polyesters are new compounds prepared by known methods and can easily be obtained in various ways from readily accessible starting materials:

(a) Diethyl malonate is condensed with alkali metal salts of sulfonated benzaldehydes in dimethylformamide solution with the aid of catalysts. The water resulting from the condensation is removed together with benzene by azeotropic distillation. The benzylidene compound is then catalytically hydrogenated with Raney nickel and hydrogen. The preparation of sodium 2-sulfonato-malonic acid diethyl ester is shown below by way of example:

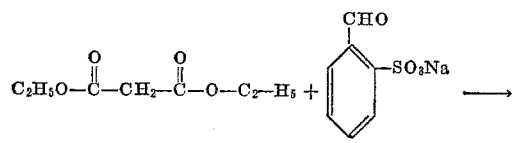

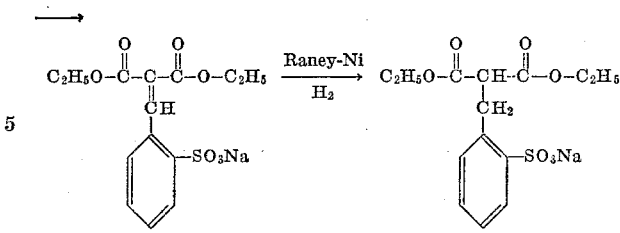

(b) Diethyl malonate is condensed with benzaldehyde and hydrogenated as described under (a). The hydrogenation product may then be sulfonated with sulfonating agents such as sulfur trioxide.

The following are examples of sulfobenzyl malonic acid derivatives:

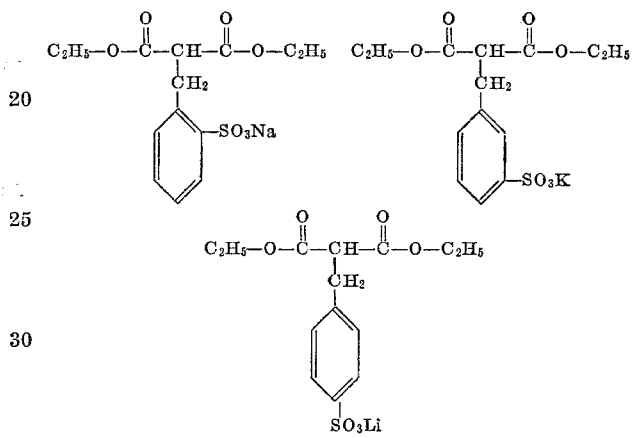

Diols suitable for the polycondensation are primarily alkylene glycols which contain from 2–20 carbon atoms, quinitol or glycols of the general structure

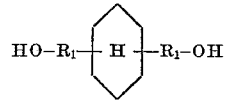

in which $R_1$ represents a straight or branched chain alkylene group containing from 1–10 carbon atoms. Ethylene glycol and bis-1,4-hydroxymethyl cyclohexane are particularly preferred.

Apart from free terephthalic acid, its esters such as dimethylterephthalate or bis-β-hydroxyethyl terephthalate and certain amounts of isophthalic acid or its esters may be used as dicarboxylic acid components.

The catalysts used for preparing the polyterephthalates are conventional ester interchange or condensation catalysts such as alkali metals and alkaline earth metals, zinc, cadmium, manganese, iron, nickel, cobalt, tin, lanthanum, lead, bismuth or combinations of these metals, salts such as calcium-, magnesium-, cobalt- or zinc acetate, lithium hydride, sodium alcoholates, zinc succinate, zinc acetyl acetonate, oxides such as lead oxide (PbO), antimony oxide ($Sb_2O_3$), germanium dioxide ($GeO_2$) and combinations such as antimony trioxide manganese acetate or antimony trioxide titanium dioxide. Germanium dioxide is preferred. The quantity of catalyst added is in the range of 0.002 to 0.2% by weight, based on the quantity of monomers.

According to a preferred embodiment of the process of the invention, the polycondensation is carried out by heating the reaction mixture consisting e.g. of a dialkyl terephthalate such as dimethyl terephthalate, ethylene glycol, a sulfonatobenzyl-malonic acid ester and a catalyst or catalyst mixture (ethylene glycol being used in excess for the ester interchange reaction) for 1–4 hours in the presence of an inert gas such as nitrogen, hydrogen or helium to 130–200° C. with stirring and then for 1–3 hours to 225–280° C. The pressure is then reduced, generally to below 15 mm. Hg and preferably below 1 mm. Hg while the temperature is kept within the range of 250–290° C. Condensation is carried out under these conditions for 1–18 hours, until the solvent-free melt has the required viscosity. After termination of the reaction, the resulting polyester can immediately be processed from the solvent-free melt to produce shaped articles such as filaments, foils or other shaped products.

The solvent-free polyesters may be mixed with additives such as pigments, matting agents, colour stabilisers or optical brightening agents, etc. without impairing the properties of the products.

The new products are distinguished by their excellent natural colour, their high affinity for basic dyes, their good mechanical and thermal properties and the ease with which they can be processed.

The relative solution viscosities $\eta_{rel.}$ given in the following examples, which are to further illustrate the invention without limiting it, were determined on solutions of 1 g. of substance in 100 ml. of m-cresol at 25° C.

EXAMPLE 1

194 parts by weight of dimethyl terephthalate, 190 parts by weight of ethylene glycol and 8 parts by weight of a sulfonate of the following formula

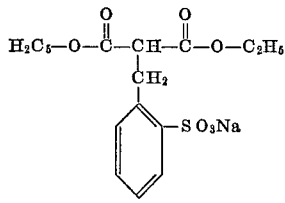

mixed with 0.4 parts by weight of zinc acetate and 0.6 parts by weight of antimony trioxide were introduced into a reaction vessel equipped with anchor blade stirrer, gas inlet tube, distillation attachment, condenser, vacuum adapter and receiver. The reactants were melted at 160° C. under a stream of nitrogen and the stirrer was switched on. The temperature was kept constant for 2 hours. It was then raised to 280° C. in the course of the next 2 hours. The supply of nitrogen was then cut off and the pressure slowly reduced to 0.03 mm. Hg in the course of 1 hour. The rate of stirring was reduced from about 150 to about 20 revolutions per minute on account of the increasing viscosity of the melt. The reaction was terminated after a further 2 hours. The colourless, homogeneous melt was worked up into filaments. The filaments were stretched in the cold and dyed with a basic dye such as C.I. Basic blue 41 which are a deep blue tone and had a high resistance to washing. The filaments had a softening range of 247–261° C. and a viscosity of $\eta_{rel.}=2.01$.

Preparation of sodium 2-sulfonato-benzyl-malonic acid diethyl ester 1456 parts by weight of 2-sodium-sulfonatobenzaldehyde, 1176 parts by weight of diethyl malonate and 17.5 parts by weight of piperidine as catalyst were dissolved in 2100 parts by weight of dimethylformamide and 2100 parts by weight of benzene and heated to the reflux temperature of benzene. The water formed during condensation was removed quantitatively from the system by aeotropic distillation. The benzene was then distilled off, the dimethylformamide solution clarified with active charcoal and the benzylidene compound hydrogenated with hydrogen at a pressure of 100 excess atmospheres and a temperature of 95° C. for 1½ hours after the addition of 50 parts by weight of Raney nickel. The catalyst was then removed and dimethylformamide and excess diethyl malonate were distilled off under vacuum. The diethyl ester of 2-sodium-sulfonatobenzyl-malonic acid remained in the form of a liquid which solidified when cooled to 0° C.

Yield: 2341 by weight (=95.5% of theory).

*Analysis.*—Calculated (percent): C, 47.7; H, 4.8; O, 31.8; S, 9.1; Na, 6.5. Found (percent): C, 47.1; H, 4.5; O, 31.1; S, 8.9; Na, 6.9.

EXAMPLE 2

A mixture of 194 parts by weight of dimethyl terephthalate, 190 parts by weight of ethylene glycol, 15 parts by weight of the sulfonate which has the following structure

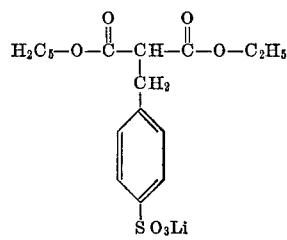

0.3 parts by weight of calcium acetate and 0.5 parts by weight of antimony trioxide were introduced into the condensation apparatus described in Example 1 and melted by heating to 170° C. and kept at this temperature for 2½ hours to effect ester interchange under a stream of nitrogen. The temperature was then raised to 280° C. within the following 2 hours. The supply of nitrogen was then cut off and the pressure reduced to 0.05 mm. Hg. Polycondensation was terminated after 4 hours. The resulting polyester was colourless and filaments obtained from the melt were stretched and dyed dark blue with a basic dye (C.I. Basic blue 69).

The softening point of the polyester was in the region of 250–259° C.; relative viscosity $\eta_{rel.}=1.95$.

Preparation of the diethyl ester of lithium-4-sulfonatobenzyl-malonic acid 125 parts by weight of the diethyl ester of benzyl malonic acid were dissolved in 250 parts by weight of anhydrous chloroform and cooled to 0° C. A solution of 40 parts by weight of sulfur trioxide in 150 parts by weight of absolute chloroform was then added in the course of 1½ hours. Stirring was then continued for 2 hours at room temperature, the chloroform was distilled off and the residue taken up with 250 parts by weight of ethanol and neutralised to pH 7 with aqueous lithium hydroxide solution with cooling. The product was then evaporated to dryness under vacuum. The melt which remained solidified when cooled to 0° C. and was pulverised. The lithium-4-sulfonatobenzyl-malonic acid diethyl ester was boiled with ethyl acetate and dried.

Yield: 153 parts by weight (=91% of theory).

*Analysis.*—Calculated (percent): C, 50.0; H, 5.0; S, 9.5; Li, 2.0. Found (percent): C, 49.4; H, 5.2; S, 9.1; Li, 1.8.

EXAMPLE 3

A mixture of 184.3 parts by weight of dimethyl terephthalate, 16.8 parts by weight of the diethyl ester of lithium-4-sulfonatobenzyl-malonic acid, 144 parts by weight of 1,4-bis-hydroxymethyl-cyclohexane, 0.5 parts by weight of manganese acetate and 0.2 parts by weight of germanium dioxide dissolved in 30 parts by weight of ethylene glycol were introduced into the condensation apparatus described in Example 1. The mixture was melted by heating it to 200° C. and then kept at this temperature for 3 hours under a stream of nitrogen with stirring to effect ester interchange. The temperature was then raised to 300° C. in course of the next hour. The supply of nitrogen was cut off and the pressure then reduced to 0.1 mm. Hg. A highly viscous, colourless polyester was obtained after 4 hours. Stretched filaments obtained from this polyester were dyed dark blue with a basic dye (C.I. Basic blue 69) and had a high resistance to washing. The softening range of the polyester was 283–289° C. Relative solution viscosity $\eta_{rel.}=2.42$.

What we claim is:

1. A high molecular weight linear terephthalic acid copolyester which contains sulfonate groups, which copolyester consists essentially of recurrent structural elements of the general formula

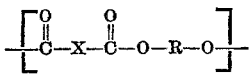

in which
X consists of from 99–70 mols-percent of a phenylene group and from 1–30 mols-percent of a sulfonate-containing group of the general formula

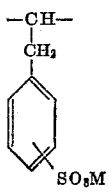

in which M denotes a metal, and
R represents a $C_2$ to $C_{20}$ straight or branched chain alkylene group, a cycloalkylene group or a group of the general formula

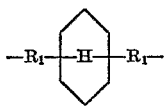

in which $R_1$ is a straight or branched chain $C_1$ to $C_{10}$ alkylene group.

2. The copolyester of claim 1 which consists of 99 to 70 mols-percent of recurrent structural elements of the general formula

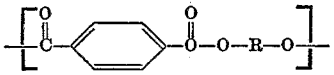

in which
R has the meaning indicated in claim 1 and 1–30 mols-percent of structural elements of the general formula

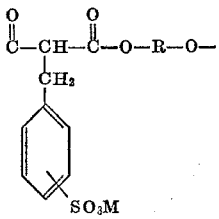

in which
R has the meaning indicated in claim 1, and
M denotes a metal.

3. The copolyester of claim 1 in which, in the general formula of claim 1, M represents an alkali metal.

4. The copolyester of claim 1 which contains from 1 to 10 mols-percent of structural elements of sulfonatobenzyl malonic acid, based on the total quantity of the dicarboxylic acid structural elements.

5. A shaped article produced from the solvent-free melt of a copolyester of claim 1.

6. A filament produced from the solvent-free melt of a copolyester of claim 1.

References Cited
UNITED STATES PATENTS
3,624,034  11/1971  Price et al. ---------- 260—49

FOREIGN PATENTS
1,520,478  6/1972  Germany.
2,052,689  4/1971  France.

MELVIN GOLDSTEIN, Primary Examiner

U.S. Cl. X.R.

8—Dig. 4